United States Patent [19]

Martin

[11] Patent Number: 4,693,433

[45] Date of Patent: Sep. 15, 1987

[54] UNWIND STAND FOR WEB ROLLS

[76] Inventor: Merrill D. Martin, 5405 Bacon Rd., Oakland, Calif. 94619

[21] Appl. No.: 871,275

[22] Filed: Jun. 6, 1986

[51] Int. Cl.$^4$ .................... B65H 19/30; B61H 13/12
[52] U.S. Cl. .................................. 242/58.6; 188/38; 188/170
[58] Field of Search ............... 242/58.6, 79, 68.4, 242/55; 188/41, 42, 38, 170; 104/17.1, 167

[56] References Cited

U.S. PATENT DOCUMENTS

| | | | |
|---|---|---|---|
| 2,346,948 | 4/1944 | Shackelford et al. | 242/58.6 X |
| 2,490,685 | 12/1949 | Greene | 242/58.6 X |
| 2,714,996 | 8/1955 | Stroehman | 242/58.6 X |
| 2,738,935 | 3/1956 | Greene | 242/58.6 X |
| 2,962,241 | 11/1960 | Campbell et al. | 242/79 |
| 3,276,711 | 10/1966 | Martin | 242/58.6 |
| 3,306,551 | 2/1967 | Martin | 242/75.46 |
| 3,321,147 | 5/1967 | Martin | 242/58.6 |
| 3,345,011 | 10/1967 | Martin, Sr. | 242/58.6 |
| 4,165,052 | 8/1979 | Seibert | 242/79 X |
| 4,209,140 | 6/1980 | Seibert | 242/79 |
| 4,460,135 | 7/1984 | Hirakawa et al. | 242/68.4 |

Primary Examiner—Stuart S. Levy
Assistant Examiner—David Werner
Attorney, Agent, or Firm—Alfons Puishes

[57] ABSTRACT

An unwind stand for positioning and controlling the unwinding of large paper rolls to processing machines is mounted on wheels riding on rails and motor driven through hydraulic motor to providing gripping and longitudinal movement of the rolls. Swinging gripping arms are mounted on the stand and disposed to grip the ends of the roll and raise it above the floor and hold it in position and provides for unwinding. The arms are capable of longitudinal movement along the axis of the roll, either individually or simultaneously, for flexibility in picking up the roll and locating it into operating position. A device is provided for final axial adjustment in alignment with the processing machine in a transverse direction and a device for gripping the rails to hold the machine in a fixed position and to prevent its tipping over. The entire stand and all its functioning elements is operated from a platform located on a cab in which are positioned various control elements for operation of the hydraulic components of the stand.

7 Claims, 7 Drawing Figures

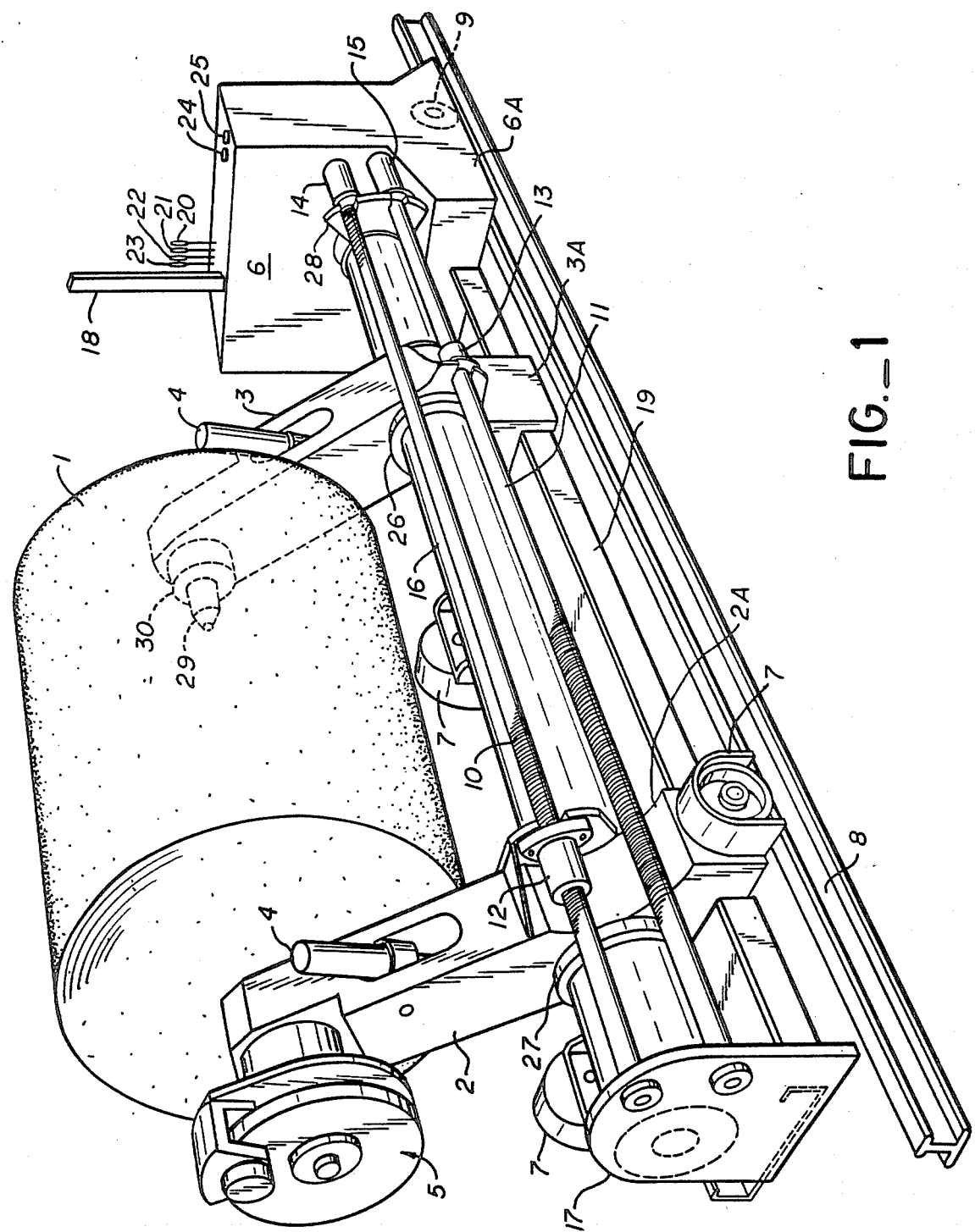
FIG._1

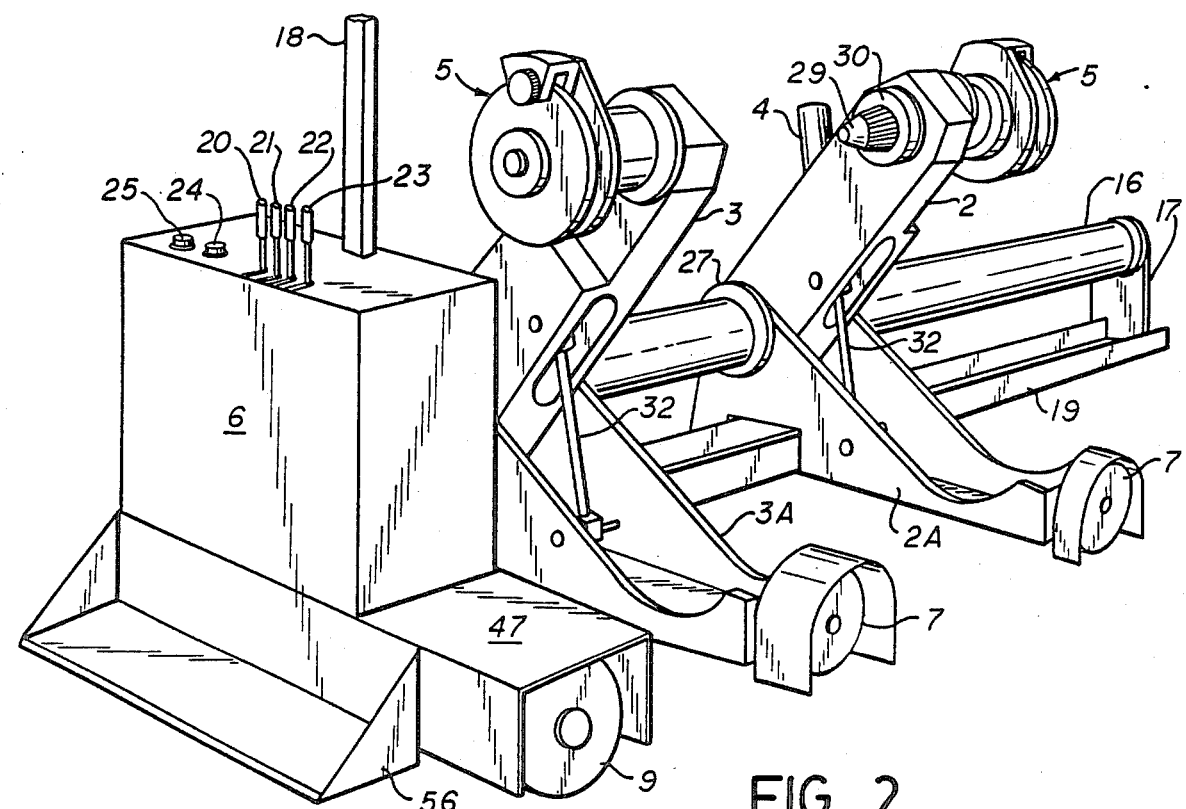
FIG._2
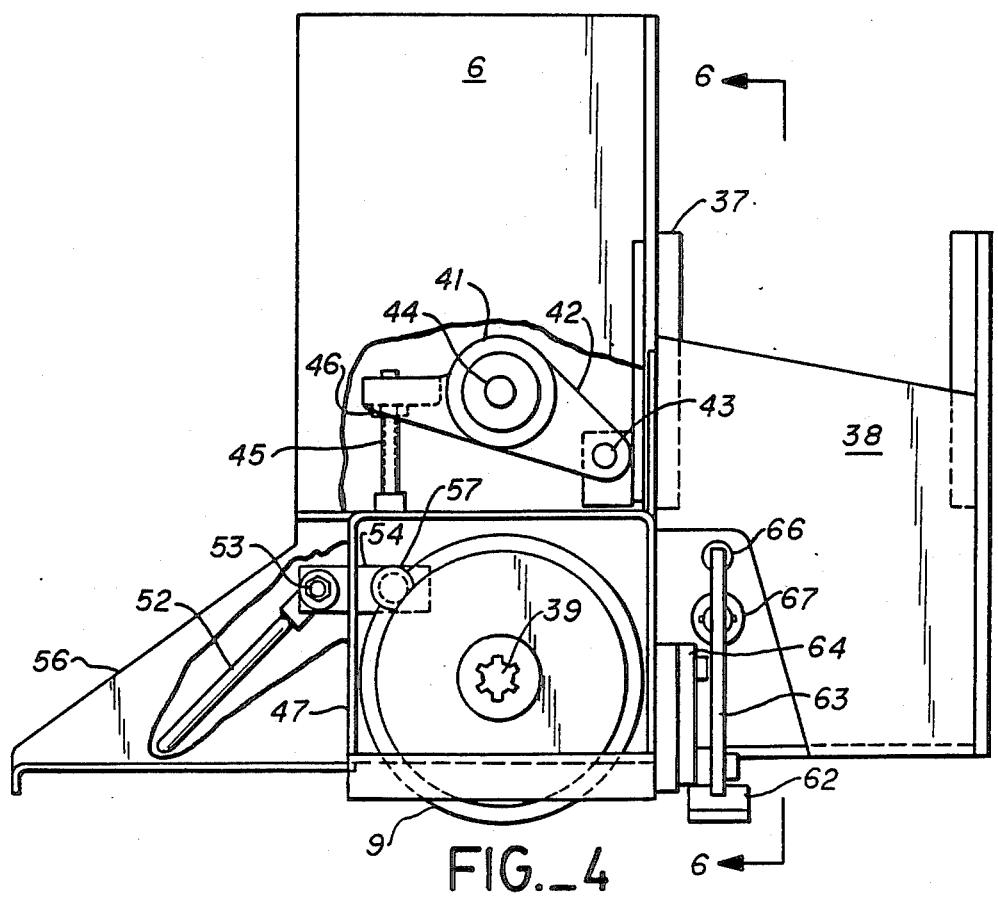
FIG._4

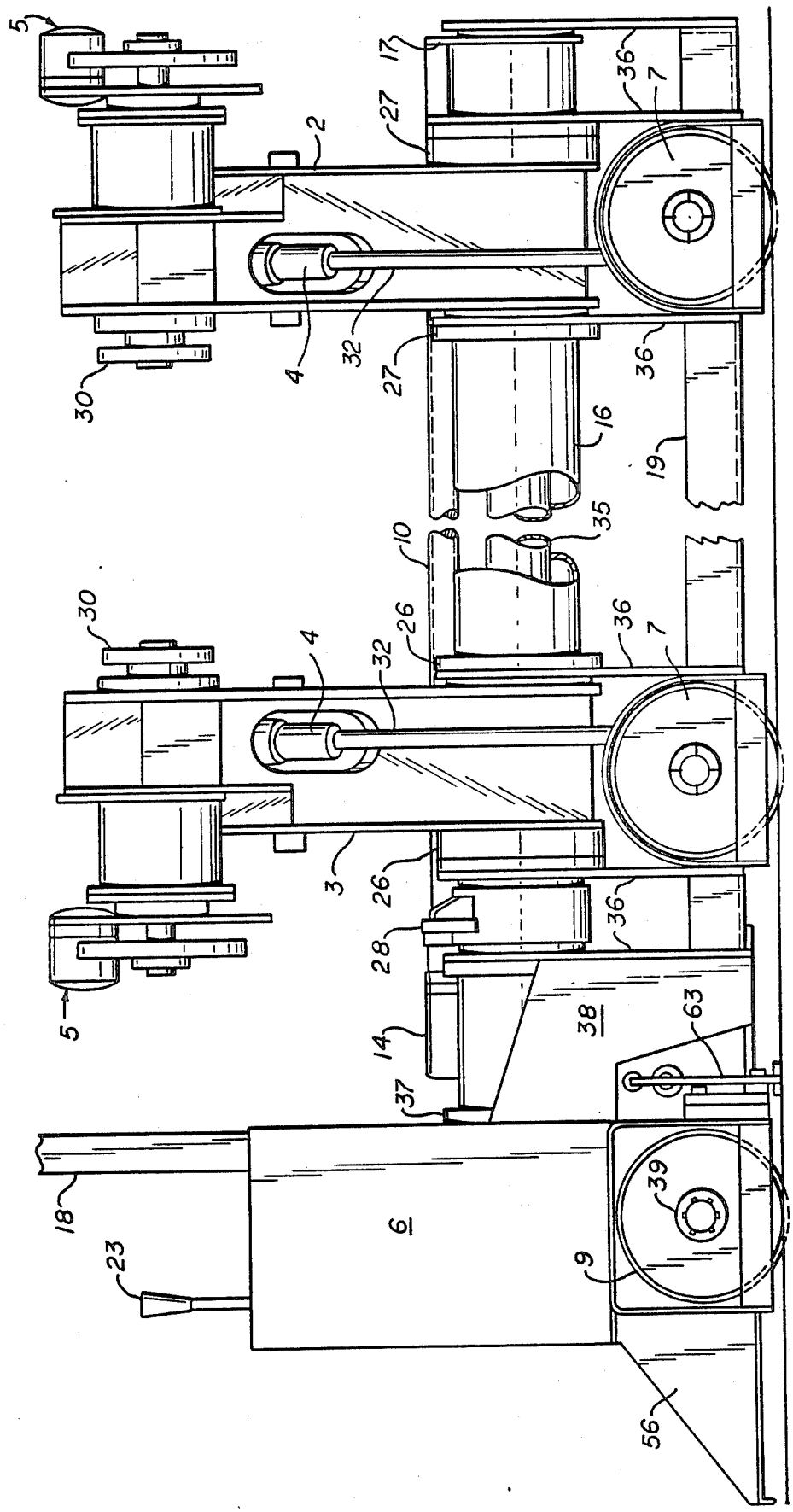

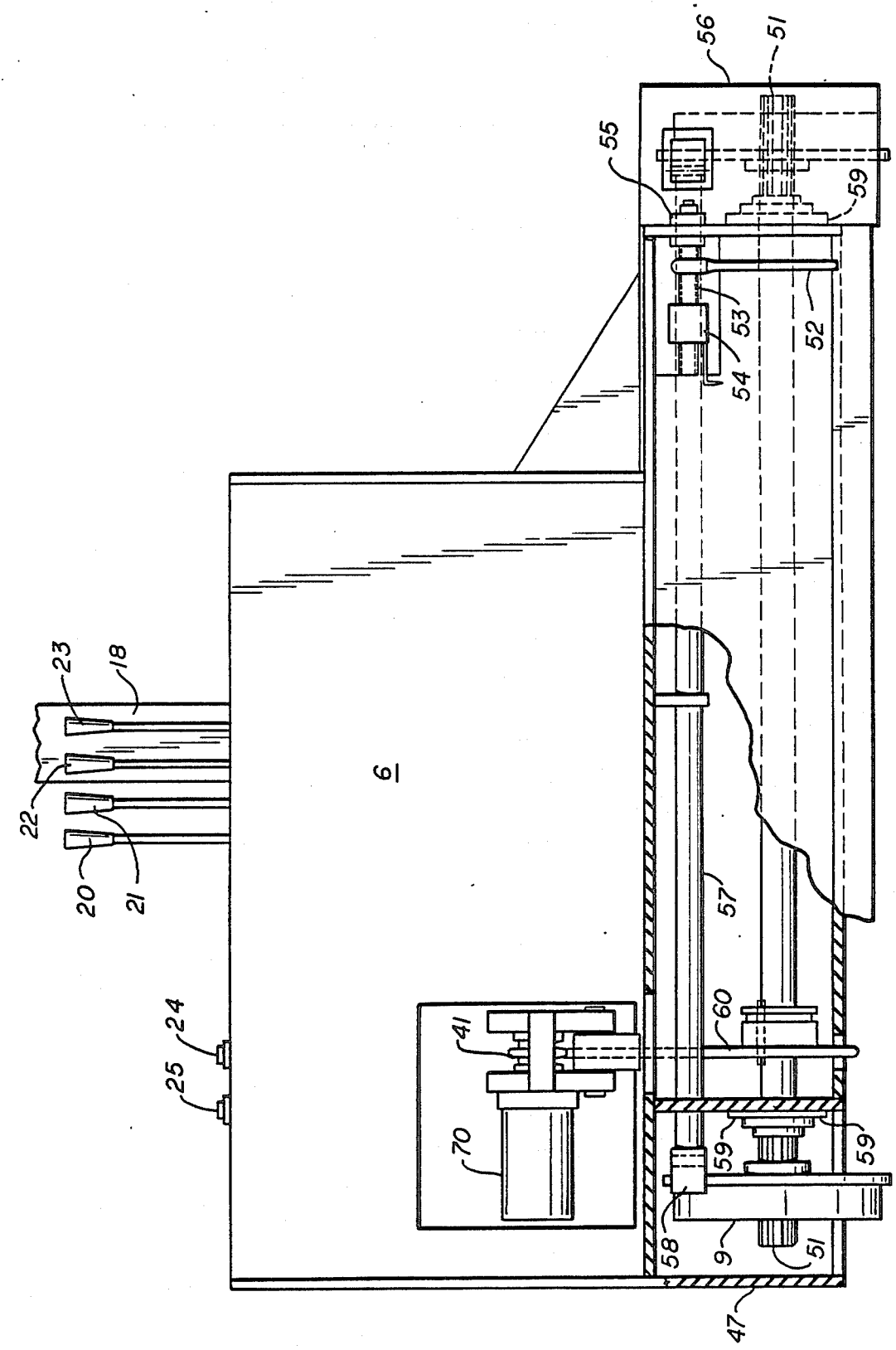
FIG._5

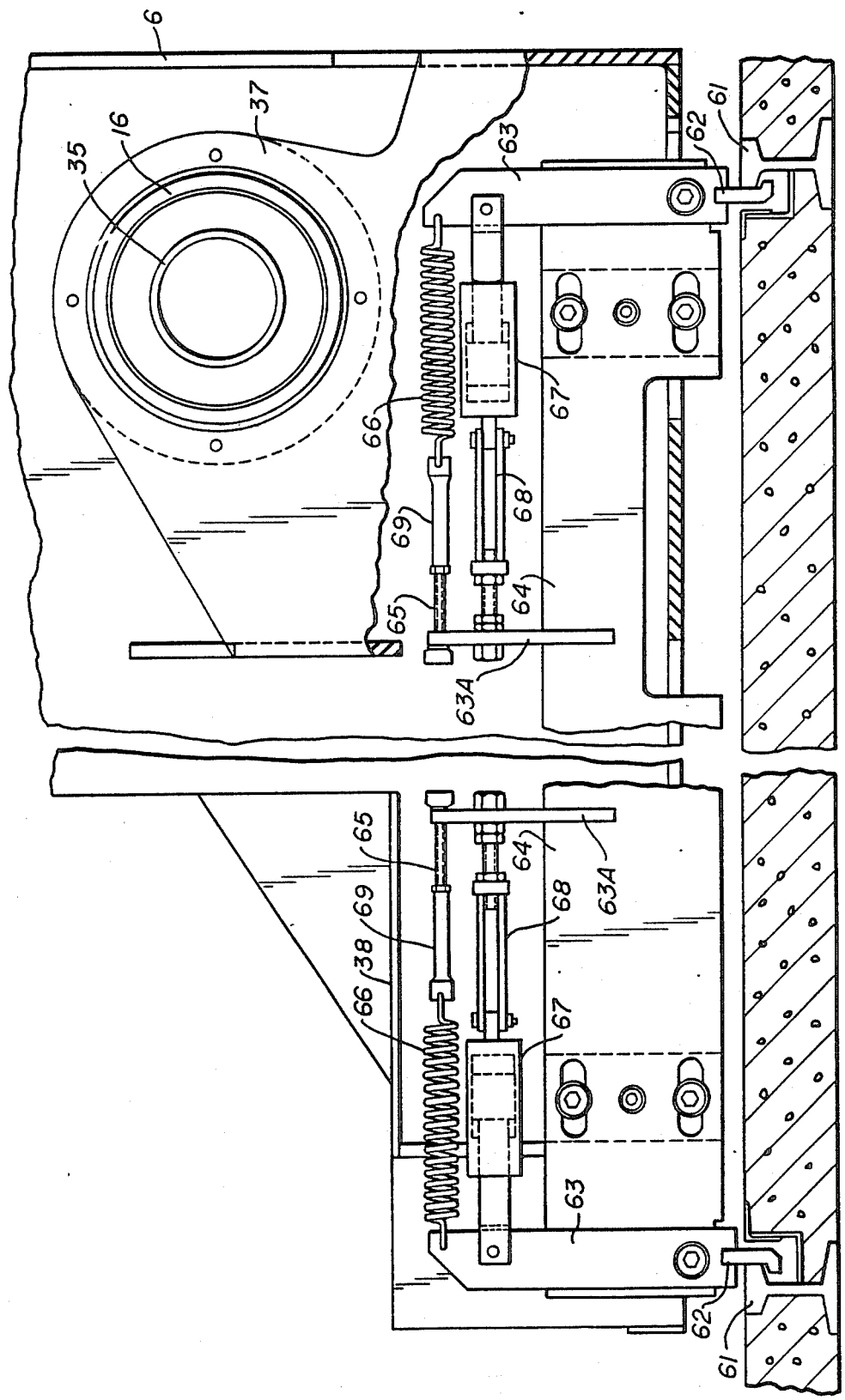
FIG._6

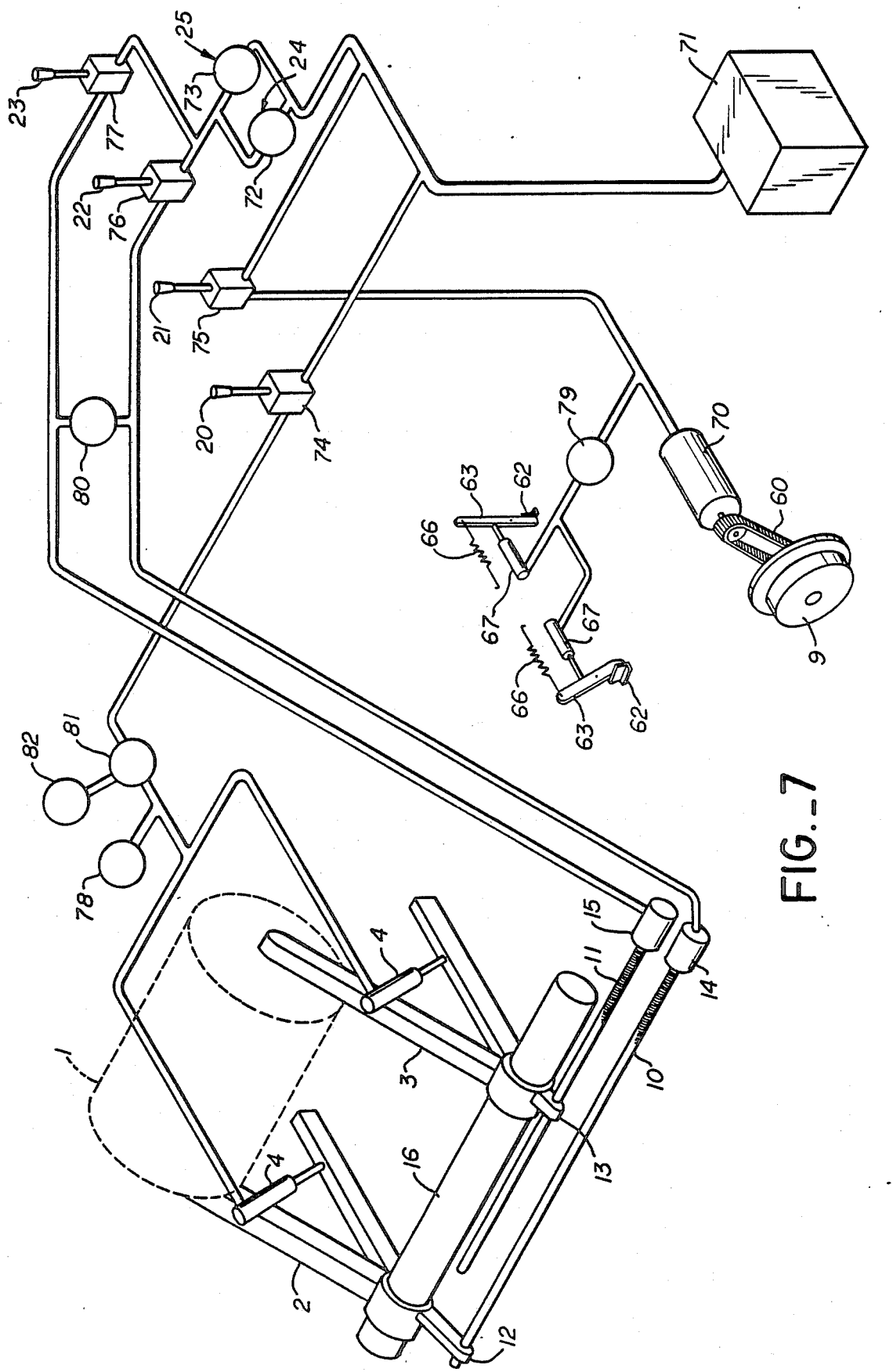
FIG._7

UNWIND STAND FOR WEB ROLLS

BACKGROUND OF THE INVENTION

This is an improvement over my U.S. Pat. No. 3,276,711 issued Oct. 4, 1966 for Unwind Stand for Web Rolls.

The purpose of this invention is basically the same as that enumerated in my previous patent. This is to facilitate the picking up and handling of large heavy rolls of paper from the floor and transferring them to a point where they can be fed into machines for further processing, such as corrugators and the like. The stand positions the rolls in alignment with the machine for further processing of the paper and maintains the paper in a state of tension as the roll unwinds and is fed into the machine.

As before, this invention obviates the necessity of using an overhead crane and lift truck to transport the paper to a stand, since the features of lifting and transporting are incorporated in my present machine which is so movable as to transport the rolls.

By use of the present machine, the rolls therefore may be conveniently transported to align with the subsequent processing machine.

In this invention, as in the previous one, I use a central hydraulic sourc of power which operates the movement of the carriage of my machine on which are positioned a pair of lifting arms, also hydraulically operated, to clamp the roll at its ends and raise it up to the proper position and transporting it to a point in alignment with a machine for the next operation.

In my previous invention one of the lifting arms was transversely fixed on the tranvelling control cab of my machine while the other one was capable of longitudinal-motion driven from the cab to effect the clamping of the roll. It was then necessary to move the entire machine so that it was in alignment with one end of the roll as represented by the fixed arm. The longitudinally movable arm was then separately operated to effect the clamping against the first arm prior to effecting the lifting of the roll.

This type of operation was somewhat cumbersome insofar as effecting the original alignment between the machine and the roll ends as the roll was resting on the floor. While my previous machine solved many of the existing problems in handling these rolls and holding them in position for processing, it did not provide the complete flexibility which could be attained if both the arms were independently movable in a longitudinal direction independent of each other and independent of the motion of the whole machine.

SUMMARY OF THE INVENTION

The present invention provides for longitudinal motion of both the parallel lifting arms independent of each other and independent of the movement of the entire machine carriage. In fact, this motion of the arms may be effected while the machine is stationary. It is possible to move the machine and arms to a position approximately opposite to where the roll is and then move the arms independently out to a position opposite the roll, driving them apart and then driving them together to clamp the ends of the roll together and then transporting the roll axially to a position opposite the machine for the subsequent processing before raising the arms to an operating position. The greater flexibility of such operation is apparent and will be more evident from a detailed description of the invention which follows.

DESCRIPTION OF THE FIGURES

FIG. 1 is a rear elevation in perspective showing the complete machine with arms and paper roll in raised position.

FIG. 2 is a front perspective showing control cab and arms in raised position.

FIG. 3 is a front elevation showing the general arrangment of the principal parts.

FIG. 4 is a view of the drive end partly cut away.

FIG. 5 is a plan view of the drive end cut away to show the main drive and roll aligner.

FIG. 6 is a side end viewe of drive end in elevation cut away to show rail safety brake.

FIG. 7 is the hydraulic piping and control diagram indicating the principal parts the their inter-relationship for control and operation of the machine in perspective.

DETAILED DESCRIPTION OF THE MACHINE

Referring first to FIG. 1, there is seen the paper roll 1 in raised position by outer arm 2 and inner arm 3, so named because of their relative position to the control cab 6. The arms are actuated by hydraulic cylinder 4 and unwinding of the roll 1 controlled by the brakes 5. The latter may be similar to that shown on Martin U.S. Pat. No. 3,276,711 or a commercial brake such as manufactured by Montalvo Corporation of Portland, Me. or Tidland Corporation of Camus, Wash., operated hydraulically or pneumatically.

The arms 2 and 3, both of which are movable longitudinally, are mounted on wheels 7 which ride upon rail 8. Control cab 6 is mounted on wheels 9 which also ride on rail 8 and forms a part of carriage 6A.

Outer arm 2 is driven longitudinally by screw 10 through travelling nut 12 which is positioned on the base of arm 2. Inner arm 3 is driven longitudinally by screw 11 through nut and flange 13 which is positioned on the frame of arm 3.

Travel screw 10 is driven by hydraulic motor 14 while travel screw 11 is driven by hydraulic motor 15 mounted on cab 6.

Both arms are keyed to an outer tube 16 which rotates with the arms and serves to keep them in alignment. This is supported by the cab at one end and by a bearing mounted on the stand 17 shown on the opposite end.

A power input to the cab which serves to drive the hydraulic pump mentioned below and such other electrical devices as are also included, is supplied through conduit 18 through a flexible cable and reel not shown. Cable tray 19 and base of the machine serves to support the various parts and also the hydraulic cables which are not shown but are described more fully in FIG. 7 below.

Control handles for operating the various hydraulic motors for operating the various components are shown at 20, 21, 22 and 23 are are used to operate the arm lift, the machine travel, the outer arm travel, and the inner arm travel respectively. Electrical control buttons 24 and 25 are used to provide high speed and low speed operation respectively of both arms simultaneously in a longitudinal direction. This provides for greater flexibility in operation.

Outboard collars 27 and inboard collars 26 are provided for the arms 2 and 3 respectively. Supports for hydraulic motors 14 and 15 and collars are shown at 28.

Roll chucks which are pointed for entry into the center of the roll spools are shown at 29. These are mounted on free rolling spindles 30 shown on the other figures. Lifting arm hydraulic piston rods 32 operated in connection with hydraulic lift cylinders 4 are better seen on the other figures, especially FIG. 2 which should be seen with reference to the foregoing description.

With special reference to FIG. 3 which in addition to the parts described previously, there is seen the inner tube 35 which forms a part of the lifting arm structure mechanism, the vertical supports 36 and 37 for the tubes. A forward projecting section of cab 6 is sown as 38 which houses some of the parts described below and there is seen also the main drive shaft 39 which is attached to a spline on main drive wheel 9.

On FIG. 4 located inside cab 6 is seen machine travel driving sprocket 41 with an adjusting arm 42 pivoted at 43 and rotating around shaft 44. Adjusting screw 45 and adjusting nut 46 are provided. Compartment 47 is located beneath the main body of cab 6 and forms an integral part thereof, housing a number of parts described below.

Shown on FIG. 5 and to a certain extent on FIG. 4 are shaft 39 with spline 51 which comprises the main drive shaft for the machine as well as the details of a device which is used to effect fine adjustments in alignment between the spool and the subsequent processing machine in a transverse direction. This comprises primarily an adjustment ratchet and handle 52 and adjustment screw 53 and adjustment nut 54 and adjustment collar 55. Adjustment shaft 57 carries at its end adjustment shoe 58 which engages the flanges of wheel 9. Main drive shaft bearings are shown at 59 and the chain and sprocket drive for the shaft at 60. The driving sprocket, as well as the hydraulic motor 70 are located within cab 6.

FIG. 6 which is a cutaway through the lower end of the forward section of the cab is concerned primarily with a safety brake mechanism which is used to insure stability of the machine in a transverse direction and as a precaution from over-tipping. This mechanism comprises primarily a pair of angular shaped brake dogs disposed for gripping under the top of rail 61 shown embedded in the floor. Brake operating arms are seen at 63 and horizontal brake bars or slidable arms at 64 secured to brake operating arm 63. Springs 66 and hydraulic piston and cylinder mechanisms one end of which is fixedly mounted on carriage 6A by plates 63A operate jointly against brake arm 63 so that when pressure is applied to the piston of 67, spring 66 is placed under additional tension, the brake dog 62 moving accordingly. Forks 68 form a linkage with brake operating arm 63 and spring tension 69 which has a threaded section and nut as shown are provided to adjust the tension on spring 66. Hydraulic piston cylinders 67 are interconnected hydraulically to the travel drive circuit so as to release the brakes when the machine is travelling longitudinally and engage the rails when the machine is stationary and lifting arms in operation. This may be seen from the hydraulic piping and control diagram of FIG. 7.

Reference should now be had to FIG. 7 where there is shown the hydraulic piping and control diagram in perspective indicating numerically the principal parts required for operation.

The hydraulic power supplied by hydraulic pump 71 is located inside cab 6 where it is driven by an electric motor, not shown on other drawings. Solenoid valve 72 controls high speed horizontal simultaneous movement of the clamping arms 2 and 3 through push button 24. Solenoid valve 73 controls the slow speed longitudinal simultaneous movement of the clamping arms 2 and 3 through push button 25.

Valve control 74 is manually operated by handle 20 and controls the hydraulic arm lifting cylinders 4. Valve 75 is manually operated from handle 21 and controls the operation of the horizontal travel of the machine by motor 70 through chain drive 60 and wheels 9. Valve 76 is manually operated and controls the longitudinal travel of outer arm 2 through hydraulic motor 14 and screw 12 by means of handle 22. Valve 77 is manually operated and controls the travel of inner arm 3 by motor 15 and screw 11 through handle 23.

An arm lifting stroke limiting device to prevent overtravel of lifting arms is provided and operated by valve 78. This functions to stop the motion of the hydraulic cylinders after a certain period is reached.

It is seen from the foregoing that arms 2 and 3 are actually supported on bases 2A and 3A by piston rods 32 acting from hydraulic cylinders 4. These are pivotally supported on bases 2A and 3A and in turn by wheels 7.

Hydraulic cylinders 67 for operating rail gripping dog 62 are tied into travel motor control 75 which operates rail travel motor 70 also protected by a check valve 79. The solenoid valve 80 interlocks control of arm clamping motors 14 and 15 and is energized along with solenoid valves 72 and 73 from push buttons 24 and 25 as set forth above.

Referring back to the alignment adjustment device of FIG. 5 described above it should be noted that operation of ratchet handle 52 turns screw 53 in either direction on fixed nut 54 positioned on shaft 57 moving it axially by pressing against collars 55 and thereby moving carriage housing 47 on its shaft along spline 51 against the action of shoes 58 on flanges of wheels 9 and hence moving transversely the alignment of roll 1 with the processing machine.

Not shown on the drawings is a tension control device such as that shown on my U.S. Pat. No. 3,306,551 which may be incorporated and used in connection with brake 5 of FIGS. 1, 2, and 3.

I claim:

1. An unwind roll stand for handling paper rolls on a spool for supplying a web of paper to a processing machine comprising:
   a travelling carriage;
   a control cab forming a part of said carriage;
   a pair of parallel swing lift arms positioned on movable bases;
   said arms being pivoted on and keyed to a rotating shaft to insure their alignment with each other;
   one end of said shaft being journaled on said carriage and the other end on an outboard support;
   hydraulic means for raising and lowering said lift arms comprising:
   hydraulic cylinders pivotally mounted on said arms;
   piston rods one end engaging pistons within said cylinders and the opposite end pivotally mounted on said bases to exert a thrust thereon;
   hydraulic means to operate said pistons to produce a reciprocating motion;
   a pair of parallel steel rails positioned longitudinally beneath said roll stand;

said bases being mounted on wheels engaging said rails;

said carriage being mounted on an axle carrying flanged wheels engaging said rails;

means for moving said bases and said arms simultaneously in a longitudinal direction along said rails independently of said carriage;

means for moving each of said bases and said arms separately in a longitudinal direction along said rails independently of said carriage to accommodate said rolls therebetween;

said means for moving said bases and said arms in a longitudinal direction comprising:

a pair of rotating screws;

hydraulic motors coupled to one end of each of said screws;

said motors being mounted on collars positioned on said carriage;

the opposite end of said screws being journaled into said outboard support;

travelling nuts disposed for engaging said screws;

said nuts being fixedly positioned on said bases;

hydraulic means for turning each of said motors separately;

hydraulic means for turning both of said motors simultaneously;

spindles positioned at the outer ends of the facing sides of said arms and having adjustable brakes mounted thereon;

pointed chuck means positioned on said spindles and disposed to engage axially the ends of said spool in said rolls at their centers and thereby grip them in position;

means for driving said axle and flanged wheels on said carriage and moving it longitudinally along said rails;

means for controlling the movement of said bases, said arms and said carriages positioned in said control cab.

2. The invention of claim 1 in which said hydraulic means comprises:

a source of hydraulic fluid under pressure;

valves controlling the flow of said hydraulic fluid to each of said motors separately;

said valves being further disposed to control the flow of said hydraulic fluid to both of said motors simultaneously;

said valves and said motors being disposed for rotating said shafts alternately in either direction.

3. The invention of claim 1, in which said means for driving said flanged wheels and axle on said carriage comprises:

a hydraulic motor positioned in said cab above said axle;

a chain and sprocket drive connecting the shaft on said motor with said axle;

said wheels being mounted on said axle by means of splines;

hydraulic means for turning said motor and thereby said axle and said wheels in either direction.

4. The invention of claim 3 in which said hydraulic means comprises:

a source of hydraulic fluid under pressure;

a valve controlling the flow of hydraulic fluid to said motor;

said valve and said motor being disposed for rotating said wheels alternately in either direction.

5. The unwind stand of claim 1 including:

a ratchet and handle positioned outside said carriage;

said ratchet engaging a screw;

said screw having one end fixedly mounted and engaging the housing of said carriage;

said screw further engaging a nut;

said nut being positioned on a longitudinal shaft extending transversely along said carriage between said flanged wheels;

a slotted shoe at each end of said shaft;

said shoes engaging the flanges of said wheels;

whereby rotation of said ratchet causes said carriage to move in a direction transverse to said wheels.

6. The invention of claims 2 or 4 in which said source of hydraulic fluid under pressure comprises a motor driven hydraulic pump positioned in said control cab;

said pump being disposed to supply said fluid to said controlling valves;

said valves being positioned within said control cab;

said valves being connected in operable relations with handles positioned on the outside of said control cab;

said handles being equipped with resiliently yieldable means to hold them in a neutral vertical position with respect to said controlling valves;

means for supplying electric power and hydraulic fluid to said pump.

7. In an unwind stand for handling paper rolls on a spool for supplying a web of paper to a processing machine, having a travelling carriage for said rolls mounted on a transverse axle having flanged wheels splined thereon and disposed to ride on longitudinal rails and having rotating lift arms for said rolls positioned thereon; the improved device for locking said carriage in a fixed position and preventing tipping thereof while said arms are in operation comprising:

a pair of horizontal cylinders;

pistons and piston rods engaging said cylinders;

helical springs positioned parallel to the horizontal axis of said cylinders;

said cylinders and one end of said spring being adjustably positioned on vertical plates fixedly mounted on said carriage;

said piston rods and the opposite ends of said springs engaging vertical arms;

said vertical arms being positioned on the ends of horizontal slideable arms;

hooked dogs positioned at the bottom end of said vertical arms;

said hooked dogs being disposed to engage said rails; thereby locking said carriage to said rails when hydraulic pressure is applied to said cylinders.

* * * * *